United States Patent Office 2,729,969
Patented Jan. 10, 1956

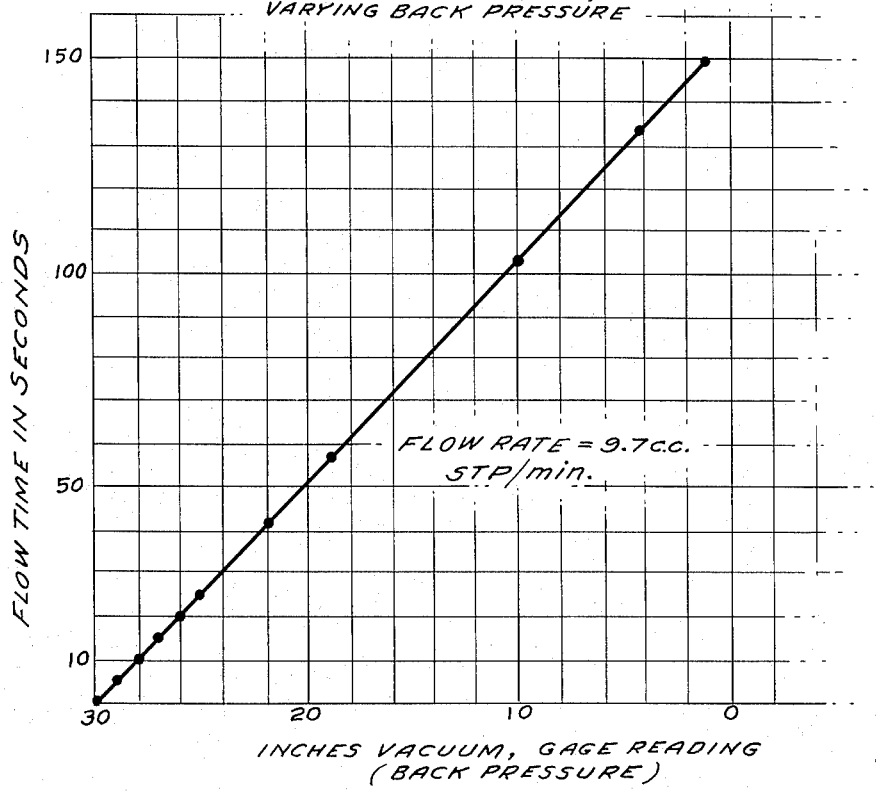
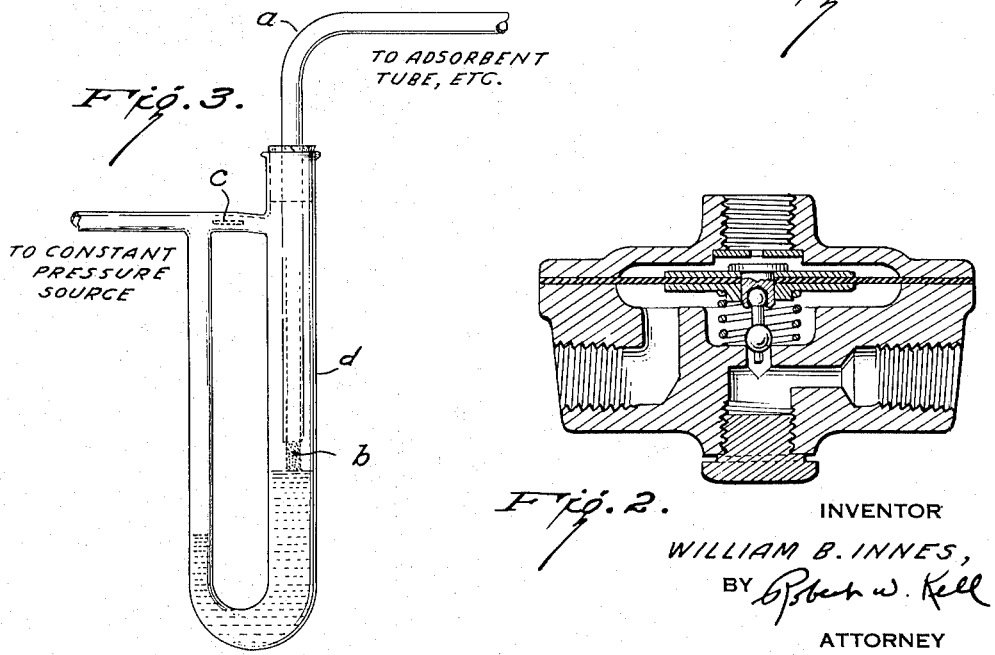

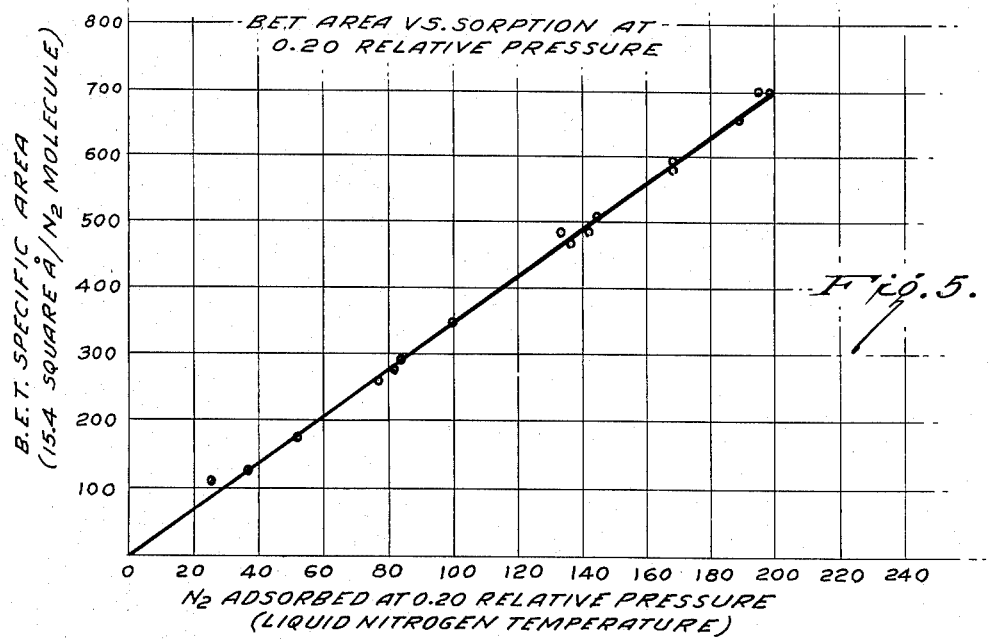
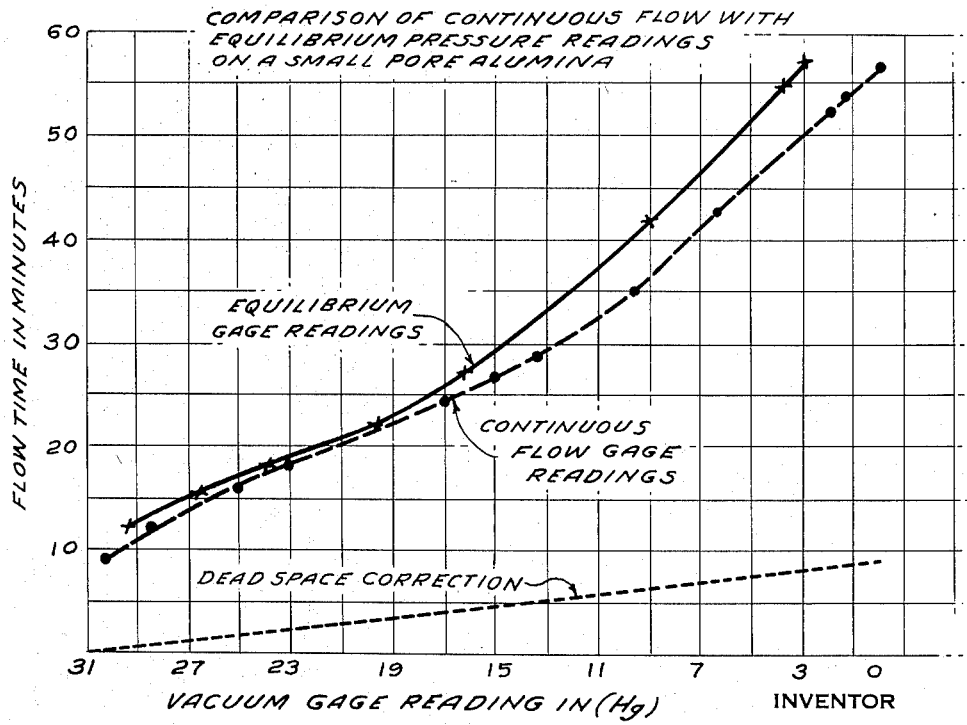

2,729,969

METHOD FOR AUTOMATIC MEASUREMENT OF SURFACE AREA AND PORE VOLUME

William B. Innes, Stamford, Conn., assignor to American Cyanamid Company, New York, N. Y., a corporation of Maine Application April 26, 1951, Serial No. 223,048

7 Claims. (Cl. 73—38)

This invention relates to a new and improved method and apparatus for the measurement of the surface area and pore volume of catalysts, pigments, soil and other materials of such physical dimensions that a knowledge of these properties becomes important.

In carrying out catalytic chemical reactions and processes, it is important to know the surface area and pore volume of the catalytic materials employed, as these factors are related to the rate of reaction. It is well recognized that the catalytic reaction takes place on the surface of the catalytic material. Pore volume or structure is important, since it governs the diffusion of reactants and products to and from the surface of the catalytic material as well as exerting considerable influence upon the stability or life of the material.

There are wide differences of structure among catalysts. Most of the cracking catalysts have practically their entire area and pore volume contributed by the very small pores, in the 15 to 100 A. pore range, whereas other materials have pores larger than 200 A. in diameter. Consequently, it is of utmost importance in practical commercial catalytic work that accurate and practical methods of determining these characteristics be employed. Such measurements are exceedingly valuable in guiding catalyst preparation, treatment and use.

My invention involves a new method for the measurement of surface areas greater than 0.5 square meter per gram and in its preferred embodiment comprises the following steps:

(1) Introducing nitrogen gas at a constant flow rate into an evacuated system containing a weighed amount of the material to be measured cooled to approximately $-195°$ C.

(2) Measuring the time required for the vacuum within the evacuated system to decrease from 29.6″ of mercury to 23.7″ of mercury.

(3) Calculating from the time required the surface area of the material.

An object of this invention is to provide a rapid, automatic method for measuring the adsorption of gases, particularly of nitrogen at liquid nitrogen temperature, whereby the determination of surface area and pore volume is greatly simplified.

The use of nitrogen as an adsorbate at liquid nitrogen temperature has been generally accepted as a standard method for determining surface area because of the close checks that could be obtained by such measurements where the area was known geometrically. A method of calculating surface area from adsorption data by plotting $$\frac{1}{V\left(\frac{1}{x}-1\right)} \text{ vs. } x \text{ in the range of } x=0.05 \text{ to } .35$$

where $V=$ cc. of nitrogen at 0° C. and 760 mm. pressure adsorbed, $Vm=$ monolayer adsorption, cc. of nitrogen at 0° C. and 760 mm. pressure,
$C=$ an isothermal constant,
$x=p/p_0=$ pressure relative to saturation, has been suggested by Brunaeur, Emmett and Teller.

A graph of their equation:

$$\frac{1}{V\left(\frac{1}{x}-1\right)}=\frac{1}{Vm}+\frac{(C-1)x}{VmC} \qquad (1)$$

is a straight line when $$\frac{1}{V\left(\frac{1}{x}-1\right)}$$

is plotted against $x$. The constant $Vm$ is evaluated from the slope and intercept of this line. The surface area is then calculated from $Vm$ by assuming a cross-section for the nitrogen molecule. The value chosen for this cross-section has ranged from 13.5 to 16.2 A²/molecule.

Another method that has been utilized in calculating the surface area of catalytic materials is based on the formula $$1nx=B-\frac{A}{V^2}$$

where A and B are isothermal constants. The constant A is evaluated from the slope of the line obtained by plotting $$1nx \text{ vs. } \frac{1}{V^2}$$

The surface area is taken as being proportional to $A^{1/2}$. For nitrogen at a temperature of $-195.8°$ C., the surface area is equal to 4.06 $A^{1/2}$. The surface area determined by this method is in agreement with the value obtained from Equation 1 using a cross-section of 16.2 A. and a crystalline catalyst. Porous materials, on the other hand, gave lower values than those obtained from Equation 1.

Either method requires that the gas be added in increments from a gas burette and time is required for the gas to equilibrate with the adsorbent at constant temperature after each addition of gas. Both measurement and calculation of surface area by the methods described above are laborious and time-consuming. This makes it difficult to test catalysts as it is often desirable to carry out many determinations and obtain the results in a short time.

The present invention provides a simple, practical, economical apparatus and method for rapid, precise measurement of surface area and pore volume of all solids having a surface area in excess of 0.5 square meter per gram, and is particularly well adapted to catalytic materials and pigments. The present invention is not applicable to the measurement of solids having small surface area; for example, steel shot, and this limitation should be recognized. My method and apparatus has proved highly satisfactory for making measurements upon cracking catalyst, Hydroformer catalyst, CO oxidation catalyst, iron oxide and other miscellaneous materials. It is an advantage of the present apparatus that it can be operated by unskilled personnel.

The distinguishing feature of my invention is the fact that I am able to introduce a very small, continuous and constant stream of gas into a tube containing the catalyst to be tested and to approximate equilibrium conditions. The total amount of gas introduced is related to the surface area of the catalyst, and may be determined by multiplying the rate of flow by the time required to reach a relative pressure of 0.10 to 0.30.

The invention will be described in greater detail in conjunction with the accompanying drawings which illustrate a specific embodiment of the invention and wherein Figure 1 is a schematic drawing of an apparatus adapted to be used in accordance with this invention;

Figure 2 is a sectional view of a constant differential type gas flow controller;

Figure 3 is an illustration of an alternate gas flow controller equally well adapted to maintain a constant flow of gas into my apparatus;

Figure 4 is a graph of the flow time in seconds vs. the back pressure in inches of mercury;

Figure 5 is a graph showing the relationship between the surface area as determined by my method and that calculated from the Brunaeur, Emmett and Teller equation, and Figure 6 is a comparison of continuous flow with equilibrium pressure readings on a small pore alumina.

Figure 1:
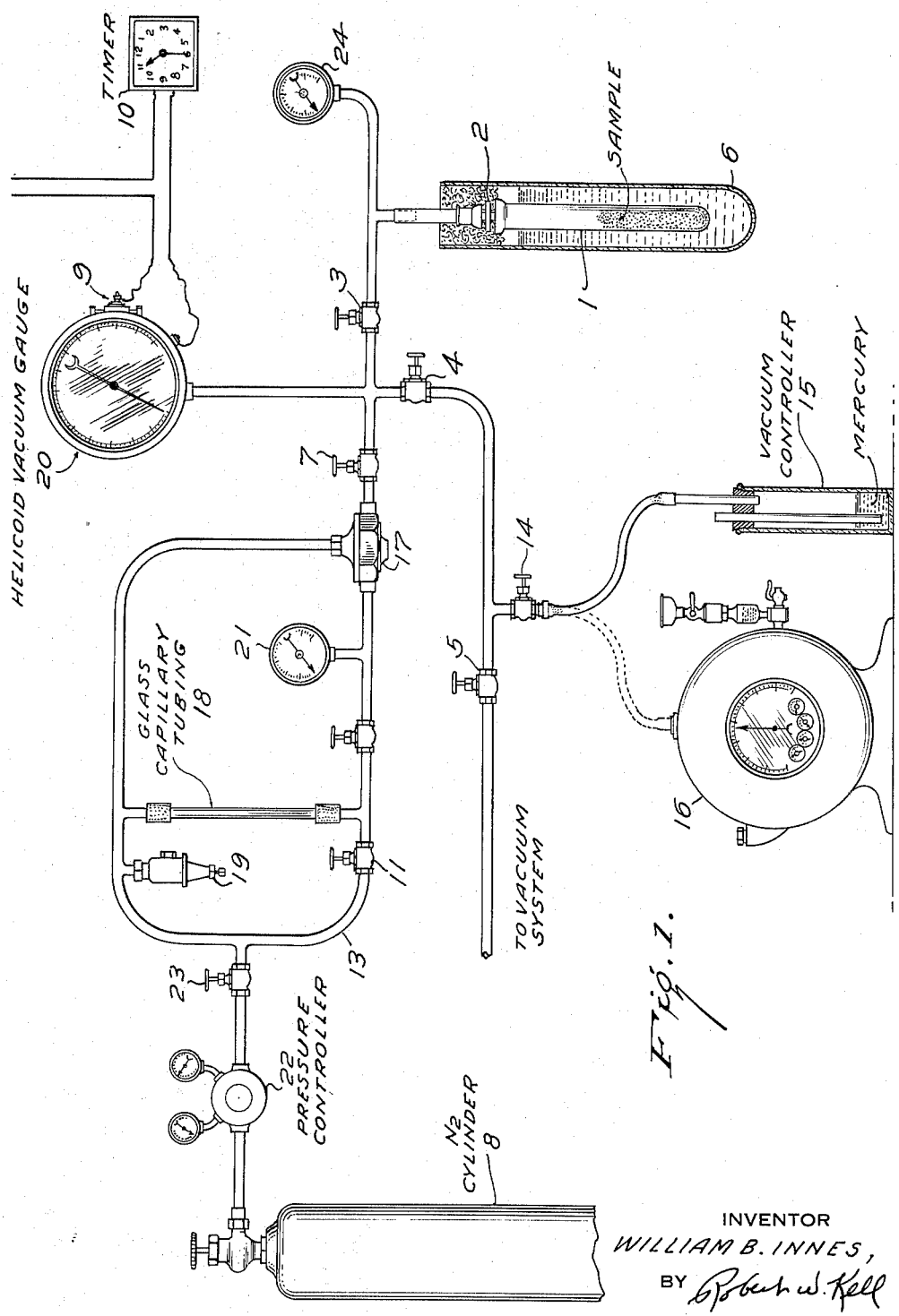

In my preferred form of apparatus illustrated by Fig. 1 a sample container 1 is immersed in a cooling bath 6 and joined to vacuum gauge 24 through airtight fitting 2. The sample container communicates with vacuum gauge 20 through valve 3. Valves 4 and 5 enable the operator to evacuate the sample tube when valve 7 is closed. Valve 7 enables the operator to introduce a gas into the evacuated sample tube when valve 4 is closed. Valve 5 opens the system to the atmosphere and valve 14 may be connected either to vacuum controller 15 or to wet-test meter 16. That part of the apparatus to the left of valve 7 in Fig. 1 consists of valves 23 and 11, safety valve 19, and pressure gauge 21, all of which communicate with conduit 13 and control the rate of gas flow, in the following manner.

When valve 11 is closed, the controller 17 operates to maintain a constant pressure drop of about 3 pounds across the capillary tube 18. The controller used may be a constant differential type such as that illustrated in Fig. 2. This type of constant differential flow controller is manufactured by the Moore Products Company of Philadelphia, Pennsylvania.

A second type of control valve which I have found well adapted to my apparatus is illustrated in Fig. 3 and claimed in my copending application Serial No. 277,420 filed March 19, 1952, now Patent No. 2,654,387. The operation of this controller is dependent upon a fritted glass member $b$ which is sealed into tube $a$. The pore diameter of the fritted glass is so small and the contact angle with mercury such that it acts as a semi-permeable membrane allowing gas to pass, but not mercury. Any increase in pressure across capillary $c$ will cause the mercury to rise in tube $d$ and close off tube $a$, which reduces the pressure drop across the capillary.

A decrease in pressure across the capillary $c$ permits the level of the mercury in tube $d$ to drop, which increases the gas flow through tube $a$ and increases the pressure across the capillary.

In my apparatus, see Fig. 1, a constant pressure of about 6.0 pounds of gas entering the system is maintained in conduit 13 between the valves 23 and 11 by the action of pressure regulator 22 and pressure relief valve 19 which is set for 6 pounds. To obtain the very low flow rate desired, the capillary tubing should have a very fine bore. The bore may vary between about 0.0005 inch and 0.003 inch, depending upon the size of sample to be tested.

The Helicoid vacuum gauge 20 was found to be quite satisfactory for vacuum measurements if it was occasionally checked against a mercury monometer. This gauge has the desirable feature that no volume change occurs with change of pressure. This gauge was equipped with contact points which break the circuit of an electric clock and thus permit the operator to automatically check the time of reaching a given pressure.

My apparatus is largely of metal construction and is rugged, compact and easy to assemble and maintain. Getting the system air-tight did not prove difficult, as leaks may be readily detected by pressurizing and soap-bubble testing.

The constant rate of gas flow into my apparatus may be checked by evacuating the system while bleeding in nitrogen through control valve 17, valves 7, 4 and 5 being opened, and valve 3 closed. When gauge 21 shows a steady state has been reached, valve 4 is closed. A plot of time vs. pressure should then be a straight line if the flow rate is constant. That this is indeed the case is shown in Fig. 4 which is a graph of the data actually observed under these conditions.

The volume $V_1$ of the low pressure side of my system between control valve 17 and valves 3 and 4 may be determined by known methods. In my apparatus this volume was determined by connecting a flask of known volume to the system and measuring with a stopwatch the time required for the pressure to rise from a gauge reading of 29" to 24". As the volume is directly proportional to the flow time and the added volume is known, it is possible to calculate the volume of the system isolated by valves 17, 4 and 3 from the time required for the pressure change with and without the added known volume. In the calibration of my apparatus, the volume of the system $V_1$ was determined to be 27.75 cc.

The actual rate of gas flow into this system under standard conditions of 0° C. and 760 mm. pressure may now be determined by application of the perfect gas law.

$$r = \text{cc. STP/min.} = \frac{\Delta P}{29.92} \times \frac{273}{T} \times \frac{V_1}{t}$$

$$= \frac{1218}{t \times t} \quad (2)$$

in which T is the temperature in degrees absolute, $\Delta P$ is the change in pressure (29"→24"), and $t$ is the time in minutes required for pressure change $\Delta P$.

It is not necessary to determine the flow rate more frequently than once every day. In repeated checks on my apparatus, I have found that the flow rate has remained substantially constant at 9.7 cc./min. for several months.

It is necessary to make a correction for the gas in the dead space $V_2$, the volume of the low pressure system between valve 17 and valve 4, and including sample tube 1. The volume of gas adsorbed by the catalyst is equal to the total amount introduced minus the amount required to fill this dead space.

To determine the amount of gas in $V_2$, the catalyst tube 1 is immersed in liquid nitrogen and the system is evacuated with valves 3, 4, 5 and 7 open while bleeding nitrogen gas through control valve 17. Valve 4 is then closed and the time required for the pressure to change five inches (29"→24" gauge) was determined. The dead space correction with the catalyst tube 1 empty is then given by the equation $$\text{cc. STP} = t \min. (29'' \rightarrow 24'') \times r \quad (3)$$

where $r$ is the flow rate as determined by Equation 2 above.

Due to impurities present in the liquid nitrogen of our cooling bath, the bath temperature is somewhat higher than the boiling point of pure nitrogen. As a result, the saturation pressure $p_0$ (the pressure at which nitrogen gas is in equilibrium with liquid nitrogen at the bath temperature) is above one atmosphere. For reasons to be disclosed later, I prefer to use a relative pressure endpoint of $0.2\,p_0$. To correct the dead space of Equation 3 so that it may be accurately applied to my actual operating conditions, I multiply by the factor $$\frac{.2 p_0}{\Delta P (29'' \rightarrow 24'')}$$

The total volume therefore becomes Equation 4.

$$\text{cc. STP} = \frac{.2 p_0 \times t \min. (29'' \rightarrow 24'') \times r}{P(29'' \rightarrow 24'')} \quad (4)$$

This was equal to .64 $p_0$.

With catalyst present in the tube, some of this space is occupied and the dead space correction is less than the total volume. The volume of the catalyst can be calculated from its skeletal density $$\left(V=\frac{\text{Sample weight}}{\text{Skeletal density}}\right)$$

Since the space is at 78° Abs., the catalyst volume is equivalent to a gas volume at standard conditions of $$V \times \frac{273}{78} \times \frac{0.2 p_0}{29.92}$$

The total correction for the dead space in my system therefore becomes Equation 5

$$C_1 = .64 p_0 - \left(\frac{273}{78} \times \frac{.20 p_0}{29.92} \times \frac{W}{d}\right) \quad (5)$$

where $C_1$ = dead space correction
$W$ = weight of sample
$D$ = skeletal density of sample For example, with a 2-gram sample of cracking catalyst having a skeletal density of 2.30 g./cc. and with a saturation pressure of 31.8 inches.

$$C_1 = .64 \times 31.8 - \frac{273}{78} \times \frac{.20 \times 31.8}{29.96} \times \frac{2.0}{2.3}$$

$$C_1 = 20.40 - 0.65 = 19.7 \text{ cc. } STP$$

In determining the surface area of a catalyst by my method, the catalyst sample must be heated prior to or during out-gassing to remove water which might lower the nitrogen adsorbed and result in low values of surface area and pore volume.

I heat the catalyst during the preparation of the sample for measurement, because subjecting the material to increased temperature is in general much more effective in eliminating adsorbed water than lowering the pressure. The relation between vapor pressure and temperature is such that water may be more completely removed from the catalyst by heating at 400° C. in a muffle open to the atmosphere than by heating to 300° C. at 0.01 mm. pressure. Although calcination will remove substantially all physical adsorbed water, it should be remembered that high temperature heat treatment may cause sintering and decrease the surface area. Most catalytic materials are used at fairly high temperatures and are therefore reasonably stable at temperatures up to 600° C. If this is not the case, the sample should be heat treated at a temperature below that which it will encounter during normal use.

The amount of water that is adsorbed during the steps of weighing and transferring the sample to the adsorption tube can be minimized by weighing and transferring in the presence of dry air or dry inert gas. This condition may be realized by using a dessicant in the balance box and/or utilizing an inert gas source such as Dry Ice, cylinder nitrogen or the like to flush out any wet air. I have found that with high area materials brief atmospheric exposure has a negligible effect.

From 2 to 20 g. of dry catalyst sample is weighed into adsorption tube 1, Fig. 1, which may be made of any suitable material that will withstand the process conditions herein set forth. This tube is secured to the system in a leak-proof manner at (2) by means of a flare fitting. The sample is degassed by opening valves 3, 4, and 5, closing valve 7 and evacuating the adsorption tube at room temperature until a pressure of less than 0.5 mm. or a leak rate of less than 0.005 cc. STP per minute is obtained. The valves used in this apparatus are conventional needle type valves, suitable for regulating gas flow.

When sample tube 1 has been evacuated, I close valve 3, which isolates the sample from the system, and immerse the adsorption tube containing the sample in a bath of liquid nitrogen 6. I then open valve 7 and allow nitrogen to flow through the controller section and into the vacuum pump until steady conditions prevail. Valve 4 is closed and the timer, which may be a conventional stopwatch of similar device, is simultaneously started. The rate of flow of nitrogen is then checked by noting the room temperature and the time in seconds required for the vacuum to decrease from 29″ to 24″ gauge pressure. These values are then substituted in Equation 2 to obtain the flow rate.

Valve 4 is now reopened and the nitrogen is evacuated until steady conditions again prevail. The surface area is measured by closing valve 4 and immediately opening valve 3. Timer 10 is started when valve 4 is closed and the contacts on pressure gauge 20 are set so that the timer will be stopped when a relative pressure of 0.2 is reached. From the time in minutes that is required to reach the aforesaid pressure, the volume of nitrogen adsorbed under standard conditions may be calculated from the expression $$V = r \times .2t - C_1$$

where $.2t$ is the time in minutes to reach a pressure of $.2\ p_0$.

The surface area in square meters per gram is given by the equation $$A = \frac{V \times 3.5}{W} \quad (6)$$

where W is equal to the sample weight in grams and 3.5 is a constant.

The constant evolved from the empirical observation that the Brunaeur, Emmett and Teller area was proportional to the adsorption at 0.2 relative pressure as shown in Fig. 5. The slope of that line is such as to indicate an area of 3.5 m.² will adsorb 1 cc. of nitrogen at $.2\ p_0$.

Closeness of approach to equilibrium may be checked by closing valve 7 at 0.2 relative pressure and observing any further pressure change as registered by the gauge 20. It was observed that with non-porous or large pore (>200 A.) materials no further measurable pressure change occurred with a flow rate as high as 10 cc. per minute, indicating that equilibrium conditions were very closely approximated despite the continuous flow. For small pore materials such as silica base cracking catalysts and Hydroformer catalysts, it was observed that with a gas flow of 10 cc./minute and a 2-gram sample, a small pressure drop occurred after closing valve 7 such that the measured adsorption was lower than the equilibrium value by 4% at the most. A closer approach to equilibrium can of course be realized by operating at a lower flow rate or using a larger sample. For example, it was observed that equilibrium adsorption was realized within 2% for small pore materials when a flow rate of 7 cc./min. was used.

It is simple to correct for this to within 1% by utilizing a slightly higher pressure value for the endpoint than .20 atmosphere so that on closing valve 7 this pressure is realized after equilibration. Another procedure is to apply a correction based on the pressure-time data which is linear in this region as indicated by a large amount of data on many materials. The latter method is illustrated by the following data on a fine pore silica-magnesia catalyst sample:

| $t$ min.: | Vacuum gauge reading |
|---|---|
| 0 | 29.6 |
| 28 | 27.0 |
| 34.5 | [1]23.7 |
| 38 | 24.5 |
| 48 | 24.5 |

[1] Closed valve 7.

Vacuum gauge reading at .2 relative pressure=23.7″ Hg.
Flow rate=9.8 cc. STP/min.

Sample weight=2.00 g.

$$\frac{\Delta P}{\Delta t} \text{ at } .20P_0 = -\frac{(27.0-23.7)}{34.5-28.0} = -.51 \text{ in./min.}$$

$$\text{Correction} = \frac{24.5-23.7}{.51} = \frac{.80}{.51} = 1.5 \text{ min.}$$

Corrected total time to
.20 atmosphere=34.5+1.5=36.1 min.
Nitrogen introduced to
.2 atmosphere=9.8×36.1=354 cc. STP
Dead space correction_____ —19 cc. STP
Adsorption (.20 relative pressure)__ 335 cc. STP $$\text{Area (m.}^2\text{/g.)} = \frac{3.5 \times 335}{2.00} = 586 \text{ m.}^2\text{/g.}$$

Physical adsorption is in general a very rapid process and even with moderate flows, equilibrium pressure would be well approximated at all times, if the gas did not have to reach the surface by a diffusion process. This diffusion process in the case of a powdered material whose particles are porous involves both diffusion through the powder and into the pore system of the particles. A closer approach to equilibrium would therefore be expected with a large diameter adsorption tube, with non-porous or large pore material, and with loose packing of the adsorbent.

Adsorption at high relative pressures (greater than .3 $p_0$) is affected by many contributing factors, among them multi-layer adsorption, capillary condensation and further monolayer adsorption. It is probable that an equally good measure of surface area can usually be obtained from the amount of adsorption at some arbitrary relative pressure above which monolayer adsorption is substantially complete and capillary condensation or multilayer adsorption small. I assumed for the purposes of my measurements, that the surface area would be proportional to the amount of gas adsorbed in the range .15–.3 $p_0$ and that results so obtained would be as accurate as those obtained from the Brunaeur, Emmett and Teller equation. In the measurement of surface area described above, I have used a relative pressure of 0.2 as standard procedure, because preliminary experimental data indicated that equilibrium was most clearly approached in this region and best agreement with the Brunaeuer, Emmett and Teller area is also realized. The deviation from equilibrium is illustrated by Fig. 5 which compares isotherms obtained in the conventional manner with my continuous flow method. This graph illustrates an extreme case in which a small sample of fine pore material was used. Other operating pressures in the range of .15–.3 $p_0$ of course may be used.

The surface area may also be determined by desorption methods by allowing the adsorbate to equilibrate at some relative pressure and then measuring the desorption on warming up to room temperature. This method may be used, but in general I prefer the continuous flow method described above.

The pore volume may be determined using the catalyst sample that was present during surface area measurements. The procedure is to introduce nitrogen rapidly into the system by opening valve 7, partially opening valve 11 with valve 3 closed and valve 4 partially open to a fixed pressure source somewhat less than .97 $p_0$, which may be the atmosphere or 1″ of vacuum obtained by combining the action of the vacuum pump, valve 5 and the vacuum controller 15. Valve 4 is adjusted so that a pressure of .97 $p_0$ is realized on gauge 20. Valve 3 is then opened, causing a slight change in the vacuum gauge reading until sorption equilibrium is reached. The rapid flow of nitrogen prevents air from gaining admission to the system.

Sorption equilibrium is reached when the pressure gauge 20 gives a steady reading of .97 $p_0$ and there is no measurable change of pressure in a reasonable time (one minute or more) with valves 7 and 4 closed. I then close valve 3 and open valve 14 and connect the wet-test meter 16 to valve 14. I remove the liquid nitrogen bath from tube 1 and replace it with a container of warm water. When the gauge 24 registers a few pounds, I slowly open valve 3 which permits the desorbed gas to flow through the wet-test meter 16. After the adsorption tube has warmed up to room temperature, desorption is practically complete and the wet-test meter reading may be taken. From this meter reading, R (in cubic feet) I calculate the specific pore volume $V_p$ in cc./g. from the equation:

$$V_p = \frac{AFR - C_2}{W} \quad (7)$$

where $F$ = pressure and temperature factor to convert to 0° C., 760 mm. Hg dry gas
$W$ = sample weight in grams
$A$ = conversion factor to convert cu. ft. STP of gaseous nitrogen to cc. liquid nitrogen at —195° C.

$$\left(\text{this is taken as } \frac{28 \times 28,316}{22,414 \times .808} = 43.8\right)$$

The dead space correction, $C_2$, is normally quite small and varies only slightly with skeletal volume and saturation pressure so that a correction based on average conditions ordinarily gives results accurate within 1%. The dead space correction in this instance is the gas in the dead space during sorption minus the gas in the dead space after desorption, or $$C_2 = \left[C_1 \times \frac{.97 p_0}{.2 p_0} - V_1 \times \frac{97 p_0}{29.92} \times \frac{273}{298}\right] - \left[\left(V_3 - \frac{W}{D}\right) \times \frac{P}{29.96} \times \frac{273}{T}\right] \quad (8)$$

where $V_3$ is the volume of the sample tube and the system isolated by valve 3, $P$ is the atmospheric pressure; and $T$ is the room temperature in degrees absolute, and $C_2$ is the dead space correction. In my apparatus at 298° absolute, this is equal to $$\left[19.7 \times \frac{.97}{.2} - 27.75 \times \frac{31}{29.96} \times \frac{273}{298}\right] - \left[27.5 - .87 \times \frac{30}{29.96} \times \frac{273}{298}\right] -$$

$$[95.6 - 26.3] - [24.4] = 44.9 \text{ cc}^{\cdot}$$

or $$\frac{44.9}{28,300} = .00159 \text{ SCF}$$

Some arbitrary decision must be made as to what relative pressure to use. If this pressure is too low, not all the pores will be filled; and if too high, appreciable condensation between particles would be expected. According to the Kelvin equation for nitrogen at —195° C., assuming cylindrical pores and a zero contact angle, the following size pores would be filled at different relative pressures:

| Relative pressure ($p/p_0$): | Pore diameter (A) |
|---|---|
| .90 | 185 |
| .95 | 374 |
| .97 | 592 |
| .99 | 1840 |

I favor using a value of $p/p_0 = .97$.

The method has been applied to a variety of materials having areas ranging from 2 to 700 m.²/g. It appears most suitable for materials having specific areas in the range 10–200 sq. m./g. For very accurate measurement of materials less than 10 sq. m./g., it would be advisable to reduce the dead space.

Reproducibility (within 2%) was invariably obtained when check runs were carried out immediately after the first run. When check runs were carried out at a later date, reproducibility was within 4%. The amount of error in area measurement due to various causes is believed to be within the following limits:

| | Per cent |
|---|---|
| Measurement of flow rate | 1 |
| Hydration of sample due to exposure to atmosphere during weighing | 1 |
| Calibration of volumes | 1 |
| Dead space correction | 1 |
| Weighing and transfer of sample to adsorbent tube | 2 |
| Measurement of flow time during adsorption to endpoint | 1 |

Other gases such as n-butane, argon, $CO_2$, CO and/or any gases having a vapor pressure of about one atmosphere at 50–225° Absolute, may be employed for area and pore volume measurements. Likewise, a manifold with several adsorption tubes may be employed in order to increase the capacity of the apparatus and/or the same gas source may be utilized for several units of the type herein specifically described for a like reason.

Where it is desired to determine the whole adsorption isotherm, my apparatus can readily be adapted for automatic measurement by use of a recording vacuum gauge. This will record the adsorption isotherm directly (uncorrected for dead space).

This invention is not to be construed as limited by the specific embodiments or examples herein set forth, but instead by the scope of the hereinafter appended claims.

I claim:

1. A method for the measurement of surface areas greater than 0.5 square meter per gram, which comprises introducing a gas at a constant rate of flow into an evacuated chamber containing a weighted amount of the material to be measured cooled to 50°–225° Absolute, measuring the time required to reach a pressure relative to saturation between 0.1 and 0.3, and calculating from the time required the surface area of the said material.

2. A method according to claim 1 in which the material to be measured is a catalyst.

3. A method according to claim 1 in which the material to be measured is a pigment.

4. A method according to claim 2 in which the gas introduced is nitrogen.

5. A method according to claim 3 in which the gas introduced is nitrogen.

6. A method for the measurement of a catalytic material having a surface area greater than 0.5 square meter per gram, which comprises introducing nitrogen at a constant rate of flow into an evacuated chamber containing a weighed amount of the catalyst cooled to approximately the boiling point of nitrogen; measuring the time required to reach a pressure relative to saturation of 0.2, and calculating from the time required the surface area of said catalytic material.

7. A method for the automatic measurement of the adsorption isotherm of materials having a surface area greater than 0.5 square meter per gram, which comprises introducing a gas at a constant flow rate into an evacuated chamber containing a weighed amount of the material to be measured cooled to 50°–225° Absolute, said chamber being connected to a recording vacuum gauge.

References Cited in the file of this patent

UNITED STATES PATENTS

| 2,293,488 | Bays | Aug. 18, 1942 |
| 2,303,890 | Moore | Dec. 1, 1942 |
| 2,392,637 | Boehler | Jan. 8, 1946 |
| 2,445,544 | Trautman | July 20, 1948 |
| 2,604,779 | Purcell | July 29, 1952 |
| 2,692,497 | Van Nordstrand | Oct. 26, 1954 |

FOREIGN PATENTS

| 339,120 | Germany | July 13, 1921 |

OTHER REFERENCES

Publication, article by Brunauer, Emmett and Teller, "Adsorption of Gases in Multimolecular Layers," Journal American Chem. Soc., vol. 60, 1938, pages 309–319.

Publication, article by James Duncan, "Determination of the Surface Area of a Solid from an Adsorption Isotherm," Faraday Society Transactions, vol. 45 (1949), pages 879–891.